United States Patent
Rottmann

(10) Patent No.: US 10,071,615 B2
(45) Date of Patent: Sep. 11, 2018

(54) AIR VENT ASSEMBLY

(71) Applicant: Volkswagen Aktiengesellschaft, Wolfsburg (DE)

(72) Inventor: Johannes Rottmann, Suepplingenburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 320 days.

(21) Appl. No.: 14/792,168

(22) Filed: Jul. 6, 2015

(65) Prior Publication Data

US 2016/0001638 A1    Jan. 7, 2016

(30) Foreign Application Priority Data

Jul. 3, 2014 (DE) .......... 10 2014 212 981
Sep. 22, 2014 (DE) .......... 10 2014 219 081

(51) Int. Cl.
*B60H 1/34* (2006.01)

(52) U.S. Cl.
CPC .................. *B60H 1/3421* (2013.01)

(58) Field of Classification Search
CPC ........................ B60H 1/3421; B60H 1/34
USPC ......... 454/99, 133, 154, 155, 265, 266, 278, 454/279, 69, 325, 326, 290, 335, 330, 454/336, 348, 351, 347, 338, 320, 319, 454/314, 303, 309, 311, 127; 361/695, 361/690
See application file for complete search history.

(56) References Cited

U.S. PATENT DOCUMENTS

| | | | |
|---|---|---|---|
| 4,957,036 A | 9/1990 | Fujihara et al. | |
| 5,230,654 A * | 7/1993 | Bloomer | B60H 1/345 454/155 |
| 5,556,334 A * | 9/1996 | Cecotti | B60H 1/3421 454/155 |
| 6,902,474 B2 * | 6/2005 | Gehring | B60H 1/3414 454/152 |
| 9,028,307 B2 | 5/2015 | Furukawa | |
| 2013/0149952 A1 | 6/2013 | Demerath | |

FOREIGN PATENT DOCUMENTS

| | | |
|---|---|---|
| DE | 103 35 219 B3 | 4/2005 |
| DE | 20 2007 017 701 U1 | 5/2008 |
| DE | 10 2009 044 363 B4 | 5/2011 |

(Continued)

OTHER PUBLICATIONS

Korean Office Action for Korean Application No. 10-2015-0092665 dated Jul. 25, 2016—English translation.

*Primary Examiner* — Gregory Huson
*Assistant Examiner* — Ryan Faulkner
(74) *Attorney, Agent, or Firm* — Muncy, Geissler, Olds & Lowe, P.C.

(57) ABSTRACT

An air vent assembly, for example, for a motor vehicle, having an air vent, which has at least one air guide louver with a trailing edge and a leading edge, whereby the air guide louver with its leading edge is mounted pivotable about a rotation axis associated with the trailing edge, and having a decorative device. It is provided that the decorative device has at least one stationary decorative louver with a visible edge extending in the extension of the trailing edge, and that the air guide louver is mounted on the decorative louver pivotable about the rotation axis.

15 Claims, 2 Drawing Sheets

(56) References Cited

FOREIGN PATENT DOCUMENTS

| | | |
|---|---|---|
| DE | 20 2012 009 059 U1 | 10/2012 |
| DE | 10 2011 120 915 B4 | 9/2013 |
| DE | 10 2012 205 148 A1 | 10/2013 |
| DE | 10 2012 015 748 A1 | 2/2014 |
| EP | 1 724 136 A1 | 11/2008 |
| EP | 1 655 160 B1 | 2/2010 |
| EP | 2 604 456 A1 | 6/2013 |
| JP | H 02-76512 U | 6/1990 |
| JP | H 06-50917 U | 7/1994 |
| JP | H 07-36810 Y2 | 8/1995 |
| JP | H 08-178408 A | 7/1996 |
| JP | H 09-95126 A | 4/1997 |
| JP | 2001-116341 A | 4/2001 |
| JP | 2010-202108 A | 9/2010 |
| WO | WO 2013/018385 A1 | 2/2013 |
| WO | WO 2013/128763 A1 | 9/2013 |

* cited by examiner

AIR VENT ASSEMBLY

This nonprovisional application claims priority under 35 U.S.C. § 119(a) to German Patent Application Nos. 10 2014 212 981.8, which was filed in Germany on Jul. 3, 2014, and 10 2014 219 081.9, which was filed in Germany on Sep. 22, 2014, and which are both herein incorporated by reference.

BACKGROUND OF THE INVENTION

Field of the Invention

The present invention relates to an air vent assembly, particularly for a motor vehicle, having an air vent, which has at least one air guide louver with a trailing edge and a leading edge, whereby the air guide louver with its leading edge is mounted pivotable about a rotation axis associated with the trailing edge, and having a decorative device.

Description of the Background Art

Air vent assemblies of the aforementioned type are known from the prior art. Thus, for example, patent DE 103 35 219 B3 discloses a generic-type air vent assembly, which comprises an air vent with a plurality of air guide louvers arranged parallel to one another and a decorative device. The air guide louvers in this case are retained pivotably in a housing of the air vent and the decorative device is made in the shape of a decorative screen and is designed for covering the housing and for the visual matching of the air vent in the vehicle interior.

SUMMARY OF THE INVENTION

It is therefore an object of the present invention to provide an air vent assembly that provides an improved integration of an air vent assembly into a vehicle interior in a simple and cost-effective manner.

An air vent assembly according to an embodiment has the advantage that the air vent can be integrated into the vehicle interior so well that the transition from the decorative device to the air vent is barely visible. In addition, it is possible due to the design that the decorative device itself likewise contributes to air conduction. The air vent assembly according to an embodiment is notable in that the decorative device has at least one stationary decorative louver with a visible edge extending in an extension of the trailing edge of the air guide louver, and that the air guide louver is mounted on the decorative louver pivotable about a rotation axis. The decorative device can have at least one decorative louver extending in the extension of the air guide louver. The louvers can lie next to one another in their longitudinal extension and can be directly side by side, so that the transition from one louver to the other is no longer noticeable from a certain distance. In this case, the air guide louver is mounted pivotably directly on the decorative louver. The decorative louver can form a bearing element for the air guide louver and can replace a conventional housing. The decorative louver can be attached, for example, to a housing or the like and can be formed stationary, in contrast to the air guide louver. The decorative device can simulate the air vent, so that it is possible to integrate the air vent even better visually into the vehicle interior. This is the case particularly when the decorative louver extends far into the vehicle interior, for example, along the dashboard up to the center console or the like or up to a door-side end of the dashboard.

According to an embodiment of the invention, the visible edge and the trailing edge can have a cross section in the shape of, for example, a circle segment, particularly a semicircle. The outflow-side edges of the air guide louver and the decorative louver can therefore be made rounded. Because the edges have the shape of a circle segment, especially of a semicircle segment, it is not visible at first glance to a user whether the associated louver, therefore the decorative louver or air guide louver, is or is not pivoted. Moreover, a substantially similar outflow behavior is assured regardless of the pivoting position of the air guide louver.

The visible edge and the trailing edge can have the same radius to the rotation axis in cross section. The visible edge and trailing edge in the shape of a circle segment or semicircle segment run along a surface that can have the same radius to the rotation axis around which the air guide louver can be pivoted, so that during pivoting of the air guide louver no offset of the trailing edge relative to the visible edge results. Because of the circular shape with the same radius and the mutual (rotation) axis, it is assured that during pivoting of the air guide louver as well, the visible edge and trailing edge are always flush or substantially flush to one another at least in sections, so that likewise when the air guide louver is pivoted out of a neutral position (parallel to the decorative louver), this is not apparent at first glance based on the trailing edge and visible edge. It is also prevented that wind noises arise at the transition from the air guide louver to the decorative louver in the area of the trailing edge when air flows out of the air vent.

According to an embodiment of the invention, the air guide louver can be mounted by a pivot pin on the decorative louver. This represents an especially simple pivotal support of the air guide louver for the pivoting thereof. The pivot pin in this case can be made as a single piece with the air guide louver or with the decorative louver and inserted in a suitable pin receiver in the decorative louver or the air guide louver.

Also, the pivot pin can be a separate part that is inserted both in a pin receiver of the air guide louver and also the decorative louver in order to mount the air guide louver pivotably on the decorative louver. The pivot pin can extend along the rotation axis from a front side of the air guide louver to the neighboring front side of the decorative louver. The air guide louver can be held pivotably in a conventional manner on a side opposite to the decorative louver.

If the pivot pin is made as a separate part, the pivot pin can be fabricated of metal and the air guide louver and the decorative louver of plastic. As a result, the advantage arises that the air guide louver and the decorative louver are simple to manufacture and with a saving of weight, whereas the metal pivot pin also withstands high stresses. By being made of metal, the pivot pin can be realized with a smaller diameter with the same strength in comparison with a pivot pin made of plastic. According to an embodiment, the pivot pin can also be fabricated of plastic, particularly in a one-piece design with the decorative louver or air guide louver, as a result of which the number of parts is reduced and the installation is simplified.

Furthermore, the air guide louver and the decorative louver can lie flush against one another in a pivoted position of the air guide louver. In particular, a top and a bottom flow surface that connect the leading edge with the trailing edge are formed substantially identical to the surface of the decorative louver at least in areas, so that in a pivoted position, for example, a neutral pivoted position, the air guide louver merges directly into the decorative louver, or the air guide louver can lie flush with the decorative louver when viewed as a whole. As a result, in the neutral position or in the neutral pivoted position of the air guide louver, especially few wind sounds and an optimal visual integration of the air vent into the decorative device result.

Further, flow surfaces of the air guide louvers can be formed without any raised areas at least in the flow direction. The top and bottom flow surfaces, which lead from the leading edge to the trailing edge, are therefore formed intrinsically flat. The flow surfaces may have a curvature, which, however, then extends over the entire flow surface from the leading edge to the trailing edge. It can also be provided that the flow surfaces can run parallel to one another. The design with no raised areas assures that the flow surfaces merge directly into the leading edge or trailing edge, so that in the area of the trailing edge no bead-shaped formation arises, which, on the one hand, would be fluidically unfavorable and, on the other, is visually not very attractive.

In an embodiment, the visible edge and the trailing edge can each be provided with a decoration, which differs in color from the air guide louver and the decorative louver. The decoration thus can emphasize the trailing edge and the visible edge, as a result of which the area, farther back, of the decorative louver and of the air guide louver is less noticeable. The impression that the decorative louver and the air guide louver represent a continuous louver is increased further as a result. It is provided in particular that the decoration has a light color in comparison with the air guide louver and the decorative louver.

The visible edge and the trailing edge can be chrome-plated for decoration. This produces an especially high-quality visual impression. The louvers, for example those fabricated of plastic, can be dark in color, for example black or mat black. Together with the semicircular design of the trailing edge and the visible edge, the advantageous impression is given thereby that the decorative louver and the air guide louver form a continuous complete louver, also when the air guide louver is pivoted.

The decorative louver can be attached at least to a back wall of a housing receiving the decorative louver and especially also the air guide louver. As a result, a simple integration of the decorative louver and a secure fastening thereof are assured. The decorative louver can be formed as a single piece with the housing. Alternatively, the air guide louver and decorative louver can also each be taken up in its own housing, whereby the two housings can be designed visually so that they are perceived visually as a single housing by a vehicle occupant.

The air vent assembly can have a plurality of air guide louvers and decorative louvers, which are designed and arranged according to the invention. The number of decorative louvers can correspond to the number of air guide louvers, so that each air guide louver is extended visually by a stationary decorative louver, as previously described. The particular air guide louver together with the decorative louver forming its extension forms a complete louver whose decoration can differ from another complete louver. The plurality of complete louvers can be arranged to be parallel to one another, in order to assure, on the one hand, advantageous air vent flow conditions and, on the other, to produce a high visual quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
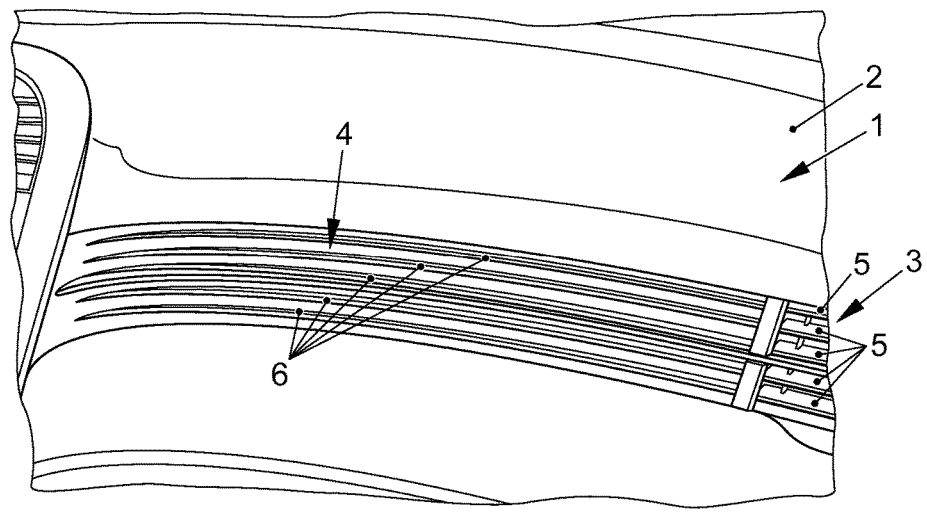
FIG. 1 shows a vehicle interior with an air vent assembly.

FIG. 1 shows the interior of a motor vehicle with an air vent assembly 1, which is inserted in a dashboard 2 of the motor vehicle on the passenger side. Air vent assembly 1 has an air vent 3 and a decorative device 4.

Air vent 3 has a plurality of air guide louvers 5, which are mounted pivotably. Decorative device 4 has a number of decorative louvers 6 which correspond to air guide louvers 5 and basically have the same shape as air guide louvers 5. For each air guide louver 5, a decorative louver 6 therefore extends in the extension of the particular air guide louver 5 along dashboard 2.

Figure 2:
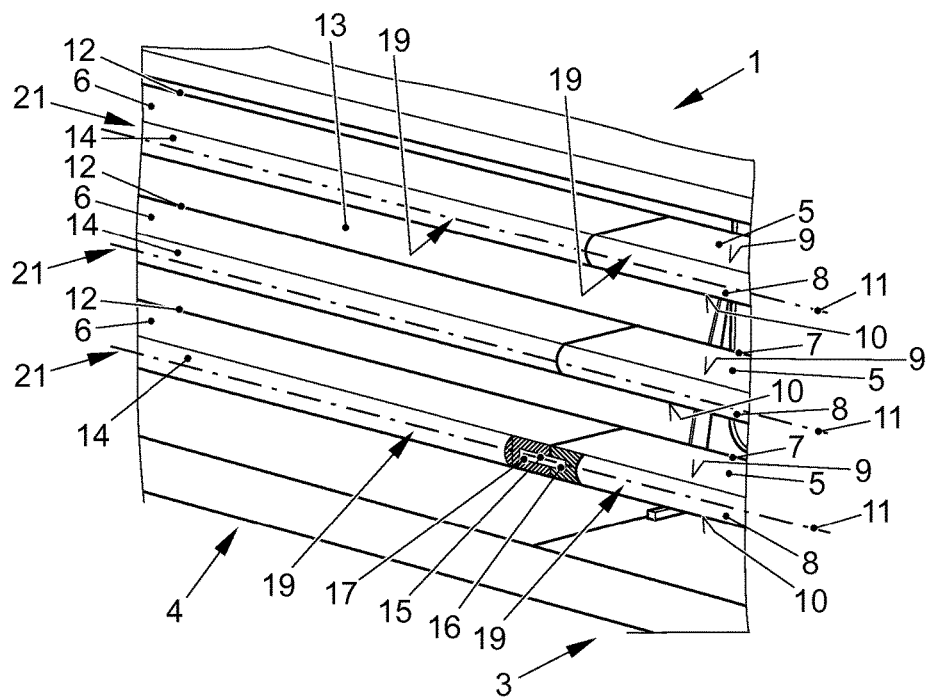
FIG. 2 shows an enlarged detailed view of the air vent assembly according to an exemplary embodiment.

FIG. 2 shows an enlarged detailed view of air vent assembly 1 according to an advantageous exemplary embodiment. In the present case, air vent 3 has three pivotable air guide louvers 5. Each air guide louver 5 has a (back) leading edge 7 and a (front) trailing edge 8. Furthermore, each air guide louver 5 has a top and bottom flow surface 9, 10, which leads from the particular leading edge 7 to the particular trailing edge 8. Flow surfaces 9, 10 in the present case run parallel to one another and without any raised areas from leading edge 7 to trailing edge 8, so that air guide louvers 5 overall have a flat cross section without any raised areas. Trailing edges 8 of air guide louvers 5 are formed semicircular. Each air guide louver 5 is mounted pivotable about a rotation axis 11. The particular rotation axis 11 in this case runs through the particular air guide louver 5 in the area of trailing edge 8, so that leading edge 7 can be pivoted about rotation axis 11. In the present case, rotation axis 11 lies in the center of the semicircular trailing edge 8, so that it runs along a radius R to rotation axis 11.

Decorative louvers 6 each have a cross section corresponding to air guide louvers 5. In contrast to air guide louvers 5, decorative louvers 6 are formed stationary, however. To this end, decorative louvers 6 are fixedly connected at their back side 12 to a housing 13. In particular, decorative louvers 6 are formed as a single piece with housing 13. Decorative louvers 6 have visible edges 14 corresponding to trailing edges 8. Visible edges 14 are therefore also formed semicircular, with the same radius R about the particular (extended) rotation axis 11. As a result, in each case a visible edge 14 lies flush side by side with a trailing edge 8, as shown in FIG. 2. For a vehicle occupant looking at air vent assembly 1, therefore, a decorative louver 6 and air guide louver 5 arranged side by side appear visually as an at least substantially uninterrupted continuous unit.

It is provided for a rotatable mounting of the particular air guide louvers 5 that a pivot pin 15 is provided, which in each case lies mounted rotatably in a pin receiver 16 of air guide louvers 5 and in a pin receiver 17 of the associated decorative louver 6, as shown in FIG. 2 in a partial sectional view of the lowest air guide louver 5 and decorative louver 6. Pivot pin 15 is made cylindrical and thus forms a pivot bearing for air guide louver 5. The central axis of pivot pin 15 extends expediently along rotation axis 11, so that the particular air guide louver 5 can be pivoted accordingly about the respective rotation axis 11, as previously described.

Figure 3:
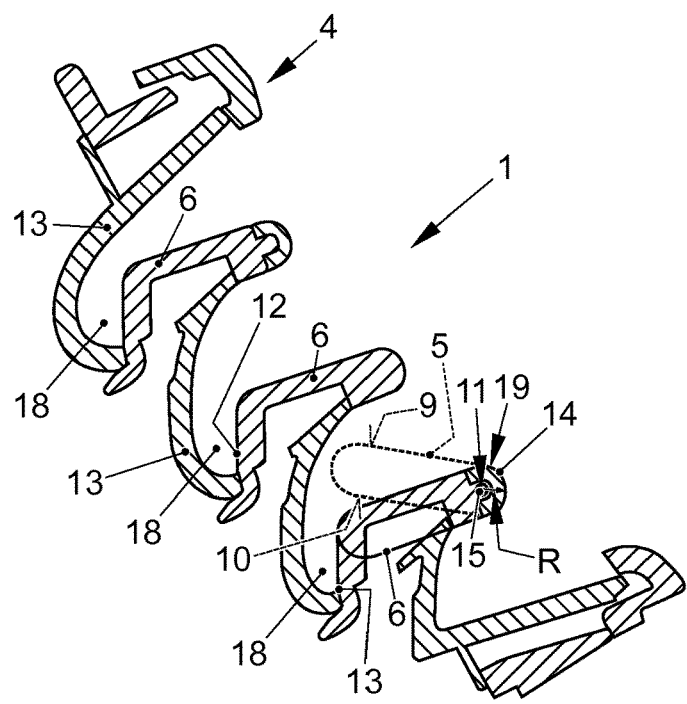
FIG. 3 shows a simplified cross-sectional illustration of the air vent assembly.

For a better understanding, FIG. 3 shows air vent assembly 1 in a cross-sectional illustration. Three stationary decorative louvers 6 lying one above the other are shown, which are spaced apart and oriented parallel to one another. Decorative louvers 6 are each fixedly disposed on housing 13. Housing 13 is thereby formed in such a way that, proceeding from one decorative louver 6 to the next decorative louver 6, it has a light trap 18 which engages behind the next decorative louver 6 and forms a light-absorbing chamber, in which incident light beams are in particular reflected and absorbed repeatedly. In the area of the lowest decorative louver 6, in addition, an air guide louver 5 is indicated by dashed lines, which has a cross section corresponding to decorative louver 6, as previously mentioned, and is oriented pivoted relative thereto. The advantageous semicircular design of trailing edge 8 and visible edge 14 has the result that despite the pivoted air guide louver 5, air guide louver 5 and decorative louver 6 lie flush side by side on their side/edge facing rotation axis 11. This results, on the one hand, in fluidic advantages; on the other hand, the viewer is given the impression that air guide louver 5 and adjacent decorative louver 6 merge, regardless of the direction in which and the extent to which air guide louver 5 was pivoted about rotation axis 11.

This impression is further intensified in the present case in that, as shown in FIG. 2, trailing edges 8 and visible edges 14 of the two outer decorative louvers 6 and air guide louvers 5 are provided with a decoration 19 in the manner of chrome plating. To this end, trailing edges 8 and visible edges 14 can be coated for chrome plating or be formed by chrome parts, as indicated in FIG. 3. Of course, all trailing edges 8 and visible edges 14 can also be provided with the corresponding chrome plating or decoration 19. If apart from this air guide louvers 5 and decorative louvers 6 are advantageously made of a dark color and particularly mat, thus the chrome plating or decoration 19 increases the impression that adjacent air guide louvers 5 and decorative louvers 6 merge into one another.

Figure 4:
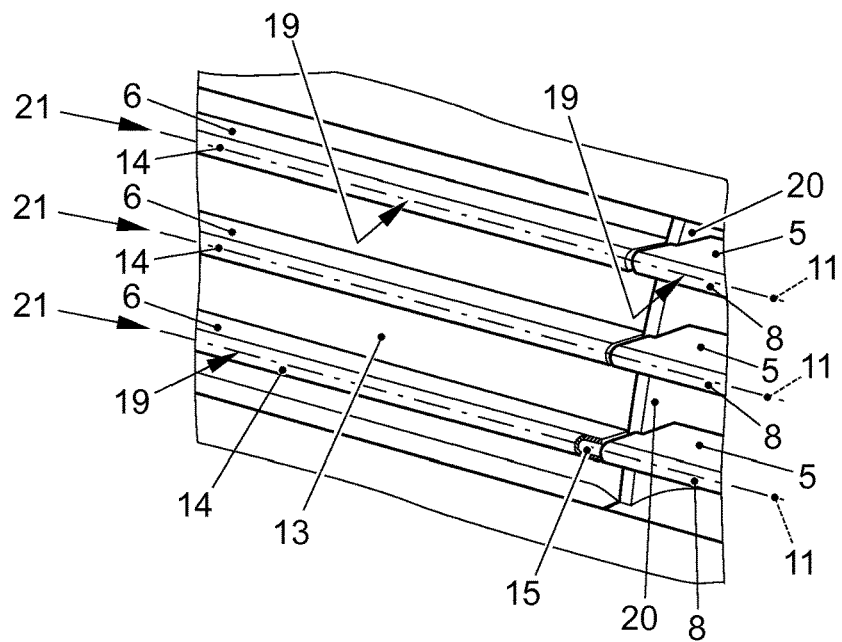
FIG. 4 shows a further exemplary embodiment of the air vent assembly in a detailed view.

FIG. 4 shows an alternative exemplary embodiment of air vent assembly 1 in which a supporting member 20 extends between air guide louvers 5 and decorative louvers 6 perpendicular to the longitudinal extension of louvers 5, 6. In this section, the adjacent air guide louvers 5 and decorative louvers 6 are arranged spaced apart, as a result of which a visual separation of decorative device 4 from air vent 3 is formed. In this regard, however, as shown in the present case, the particular air guide louver 5 and decorative louver 6, located in its extension, are expediently connected together as previously described by pivot pin 15, so that the particular air guide louver 5 can be pivoted about the particular rotation axis 11 as previously described.

According to an exemplary embodiment, it is provided that housing 13 also supports air vents 3 and mounts particularly air guide louvers 5 pivotably on the side opposite to decorative louvers 6. Alternatively, it can be provided, however, that air vent 3 and decorative device 4 are formed separately from one another and are not joined together until the installation.

Overall, an air vent assembly results for the viewer with a plurality of complete louvers 21, which are formed by an air guide louver 5 and a decorative louver 6 located in its extension, whereby the visual impression does not change when air guide louvers 5 are pivoted about their respective rotation axis 11. Decorative louvers 6 produce a free-floating effect, which imparts an especially high-quality impression. Advantageously, the particular pivot pin 15 is made of metal, so that it can be realized as especially thin, as a result of which louvers 5, 6 as previously described can be formed without raised areas and relatively thin. As an alternative to providing the separate pivot pin 15, it is also possible to form a pivot pin on one of louvers 6, 5 and particularly to make it as a single piece therewith.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air vent assembly for a motor vehicle, the air vent assembly comprising:
    an air vent that has at least one air guide louver with a trailing edge and a leading edge in a flow direction, the air guide louver being mounted pivotable about a rotation axis associated with the trailing edge; and
    a decorative device having at least one stationary decorative louver with a visible edge extending in an extension of the trailing edge, the air guide louver being mounted on the decorative louver so as to be pivotable about the rotation axis,
    wherein the air guide louver and the decorative louver are positioned side-by-side along the rotation axis, such that a side edge of the air guide louver faces a side edge of the decorative louver.

2. The air vent assembly according to claim 1, wherein the visible edge and the trailing edge have a cross section in a shape of a circle segment or a semicircle.

3. The air vent assembly according to claim 2, wherein the visible edge and the trailing edge have a same radius to the rotation axis in cross section.

4. The air vent assembly according to claim 1, wherein the air guide louver is mounted by a pivot pin on the decorative louver.

5. The air vent assembly according to claim 4, wherein the pivot pin is formed of metal, and wherein the air guide louver and the decorative louver is formed of plastic.

6. The air vent assembly according to claim 1, wherein the visible edge and the trailing edge are each provided with a decoration, which differs in color from the air guide louver and the decorative louver.

7. The air vent assembly according to claim 1, wherein the visible edge and the trailing edge are chrome-plated.

8. The air vent assembly according to claim 1, wherein the decorative louver is attached at least to a back wall of a housing receiving the decorative louver and the air guide louver.

9. The air vent assembly according to claim 1, wherein the air guide louver and the decorative louver together form a complete louver pair of the air vent assembly, and wherein the air vent assembly has a plurality of complete louver pairs that are arranged parallel to and spaced apart from one another.

10. The air vent assembly according to claim 1, wherein the side edge of the air guide louver is oriented perpendicular to the trailing edge and the leading edge and the side edge of the decorative louver is oriented perpendicular to the visible edge.

11. The air vent assembly according to claim 1, wherein the trailing edge and the visible edge are aligned along the rotation axis, such that each of the trailing edge and the visible edge are visible to an occupant inside of the motor vehicle that is facing the air vent assembly.

12. The air vent assembly according to claim 4, wherein the pivot pin protrudes from the side edge of the decorative louver and is inserted into a pin receiver provided in the side edge of the air guide louver.

13. The air vent assembly according to claim 12, wherein a central axis of the pivot pin extends along the rotation axis, such that the air guide louver pivots about the rotation axis via the pivot pin.

14. The air vent assembly according to claim 1, wherein the side edge of the air guide louver and the side edge of the decorative louver lie flush against one another in a pivoted position of the air guide louver.

15. The air vent assembly according to claim 1, wherein flow surfaces of the air guide louver and of the decorative louver are formed without raised areas at least in the flow direction.

* * * * *